United States Patent
Shen et al.

(10) Patent No.: US 11,683,692 B1
(45) Date of Patent: Jun. 20, 2023

(54) PROTECTING AGAINST POTENTIALLY HARMFUL APP INSTALLATION ON A MOBILE DEVICE

(71) Applicant: NortonLifeLock Inc., Tempe, AZ (US)

(72) Inventors: Yun Shen, Bristol (GB); Pierre-Antoine Vervier, Cagnes-sur-Mer (FR)

(73) Assignee: NORTONLIFELOCK INC., Tempe, AZ (US)

( * ) Notice: Subject to any disclaimer, the term of this patent is extended or adjusted under 35 U.S.C. 154(b) by 362 days.

(21) Appl. No.: 16/995,616

(22) Filed: Aug. 17, 2020

(51) Int. Cl.
*H04W 12/37* (2021.01)
*G06N 20/00* (2019.01)
*G06N 20/10* (2019.01)
*G06F 21/51* (2013.01)
*G06F 8/61* (2018.01)
*H04W 12/128* (2021.01)

(52) U.S. Cl.
CPC .............. *H04W 12/37* (2021.01); *G06F 8/61* (2013.01); *G06F 21/51* (2013.01); *G06N 20/00* (2019.01); *G06N 20/10* (2019.01); *H04W 12/128* (2021.01)

(58) Field of Classification Search
CPC ......... H04W 4/20–23; H04W 4/50–80; H04W 88/08–182; G06N 20/00; G06F 8/61; G06F 21/51
See application file for complete search history.

(56) References Cited

U.S. PATENT DOCUMENTS

| | | | |
|---|---|---|---|
| 9,202,049 B1* | 12/2015 | Book | G06F 21/562 |
| 9,594,904 B1* | 3/2017 | Jain | G06F 21/563 |
| 2013/0227636 A1* | 8/2013 | Bettini | G06F 21/568 |
| | | | 726/1 |
| 2015/0082441 A1* | 3/2015 | Gathala | H04L 63/1441 |
| | | | 726/25 |
| 2015/0261954 A1* | 9/2015 | Xue | G06F 21/564 |
| | | | 726/23 |
| 2017/0118237 A1* | 4/2017 | Devi Reddy | G06N 5/02 |

(Continued)

OTHER PUBLICATIONS

Yousra Aafer, Wenliang Du, and Heng Yin; "Droidapiminer: Mining API-Level Features for Robust Malware Detection in Android"; In SecureComm, 2013; 18 pages. Best Available date: Sep. 6, 2014.

(Continued)

*Primary Examiner* — San Htun
(74) *Attorney, Agent, or Firm* — Maschoff Brennan

(57) ABSTRACT

Protecting against potentially harmful app (PHA) installation on a mobile device. In some embodiments, a method may include identifying apps already installed on multiple mobile devices, identifying PHAs in the apps already installed on the multiple mobile devices, training a machine learning classifier, based on the apps already installed on multiple mobile devices, to predict a likelihood that each of the PHAs will be installed on any mobile device, identifying one or more apps already installed on a particular mobile device, predicting, using the machine learning classifier, a likelihood that a target PHA of the PHAs will be installed on the particular mobile device based on the one or more apps already installed on the particular mobile device, and in response to the likelihood being higher than a threshold, performing a remedial action to protect the particular mobile device from the target PHA.

18 Claims, 8 Drawing Sheets

(56) References Cited

U.S. PATENT DOCUMENTS

| | | | |
|---|---|---|---|
| 2018/0097826 A1* | 4/2018 | Luan | G06N 3/04 |
| 2019/0156037 A1* | 5/2019 | Gronat | G06N 5/048 |
| 2019/0394231 A1* | 12/2019 | Smith | H04L 63/1416 |

OTHER PUBLICATIONS

Kevin Allix, Tegawendé F Bissyandé, Jacques Klein, and Yves Le Traon; "Androzoo: Collecting Millions of Android Apps for the Research Community"; In IEEE/ACM Working Conference on Mining Software Repositories (MSR) IEEE, 2016; 4 pages. May 14-15, 2016.

Nicoló Andronio, Stefano Zanero, and Federico Maggi; "Heldroid: Dissecting and Detecting Mobile Ransomware"; In RAID, 2015; 23 pages. Dec. 12, 2015.

Daniel Arp, Michael Spreitzenbarth, Malte Hubner, Hugo Gascon, Konrad Rieck, and CERT Siemens; "Drebin: Effective and Explainable Detection of Android Malware in Your Pocket"; In NDSS, 2014; 15 pages. Feb. 23-26, 2014.

Albert-Laszlo Barabâsi, Hawoong Jeong, Zoltan Néda, Erzsebet Ravasz, Andras Schubert, and Tamas Vicsek; "Evolution of the Social Network of Scientific Collaborations"; Physica A: Statistical mechanics and its applications, 311(3-4), 2002; 6 pages. Jan. 2002.

Yoshua Bengio, Aaron Courville, and Pascal Vincent; "Representation Learning: A Review and New Perspectives"; IEEE TPAMI, 35(8), 2013; 30 pages. Aug. 2013.

James S Bergstra, Rémi Bardenet, Yoshua Bengio, and Balázs Kégl; "Algorithms for Hyper-Parameter Optimization"; In NIPS, 2011; 9 pages. Dec. 12, 2011.

Leyla Bilge, Yufei Han, and Matteo Dell'Amico; "Riskteller: Predicting the Risk of Cyber Incidents"; In ACM CCS, 2017; 13 pages. Oct. 30-Nov. 3, 2017.

Aleksandar Bojchevski and Stephan Günnemann; "Adversarial Attacks on Node Embeddings via Graph Poisoning"; In ICML, 2019; 12 pages. V1. Sep. 4, 2018; V2. Sep. 14, 2018; V3. May 27, 2019.

Yazan Boshmaf, Dionysios Logothetis, Georgos Siganos, Jorge Lería, Jose Lorenzo, Matei Ripeanu, and Konstantin Beznosov; "Integro: Leveraging Victim Prediction for Robust Fake Account Detection in OSNS"; In NDSS, 2015; 15 pages. Feb. 7, 2015.

Mehran Bozorgi, Lawrence K Saul, Stefan Savage, and Geoffrey M Voelker; "Beyond Heuristics: Learning to Classify Vulnerabilities and Predict Exploits"; In KDD, 2010; 9 pages. Jul. 25-28.

Leo Breiman; "Random Forests"; Machine learning, 45(1), 2001; 33 pages. Jan. 2001.

Saurabh Chakradeo, Bradley Reaves, Patrick Traynor, and William Enck; "Mast: Triage for Market-Scale Mobile Malware Analysis"; In WiSec, 2013; 12 pages. Apr. 17-19, 2013.

Chih-Ming Chen, Chuan-JuWang, Ming-Feng Tsai, and Yi-Hsuan Yang; "Collaborative Similarity Embedding for Recommender Systems"; In WWW, 2019.; 9 pages. May 2019.

Chih-Ming Chen, Yi-Hsuan Yang, Yian Chen, and Ming-Feng Tsai; "Vertex-Context Sampling for Weighted Network Embedding"; arXiv, 2017; 10 pages. Nov. 2017.

Jonathan Crussell, Ryan Stevens, and Hao Chen; "MAdfraud: Investigating Ad Fraud in Android Applications"; In MobiSys, 2014; 12 pages. Jun. 16-19, 2014.

Leonardo Dagum and Ramesh Menon; "OpenMP: An Industry Standard API for Shared-Memory Programming"; Computational Science & Engineering, IEEE, 5(1), 1998; 10 pages. Jan.-Mar. 1998.

George Danezis and Prateek Mittal; "Sybilinfer: Detecting Sybil Nodes using Social Networks"; In NDSS, 2009; 15 pages. Jan. 2009.

Steven HH Ding, Benjamin CM Fung, and Philippe Charland; "Asm2vec: Boosting Static Representation Robustness for Binary Clone Search Against Code Obfuscation and Compiler Optimization"; In IEEE S&P, 2019; 18 pages. May 19-23, 2019.

Serge Egelman, Lorrie Faith Cranor, and Jason Hong; You've been warned: an empirical study of the effectiveness of web browser phishing warnings; In CHI; ACM; 2008; 10 pages. Apr. 5-10, 2008.

William Enck, Machigar Ongtang, and Patrick Mc-Daniel; "Understanding android security"; 2009; 9 pages. Feb. 3, 2009.

Emre Erturk; "A case study in open source software security and privacy: Android adware"; In World Congress on Internet Security (WorldCIS—2012); 2012; 3 pages. Jun. 10-12, 2012.

Ming Gao, Leihui Chen, Xiangnan He, and Aoying Zhou; "Bine: Bipartite network embedding"; In SIGIR, 2018; 10 pages. Jul. 8-12, 2018.

Google; "Android Security & Privacy 2018 Year in Review"; 2019; 31 pages. Mar. 2019.

Michael Grace, Yajin Zhou, Qiang Zhang, Shihong Zou, and Xuxian Jiang; "Riskranker: Scalable and Accurate Zero-Day Android Malware Detection"; In MobiSys; 2012; 13 pages. Jun. 25-29, 2012.

William L Hamilton, Rex Ying, and Jure Leskovec; "Representation learning on graphs: Methods and applications"; arXiv preprint arXiv:1709.05584; 2017; 24 pages. Best available date: V1. Sep. 17, 2017.

James A Hanley and Barbara J McNeil; "The Meaning and Use of the Area Under a Receiver Operating Characteristic (ROC) Curve"; Radiology; 143(1); 1982; 8 pages. Apr. 1982.

Jerry L Hintze and Ray D Nelson; Violin Plots: A Box Plot-Density Trace Synergism. The American Statistician; 52(2); 1998; 5 pages. May 1998.

Colin C Ife, Yun Shen, Steven J Murdoch, and Gianluca Stringhini; "Waves of Malice: A Longitudinal Measurement of the Malicious File Delivery Ecosystem on the Web"; In ASIACCS; 2019; 12 pages. Jul. 9-12, 2019.

Luca Invernizzi, Stanislav Miskovic, Ruben Torres, Christopher Kruegel, Sabyasachi Saha, Giovanni Vigna, Sung Ju Lee, and Marco Mellia; "Nazca: Detecting Malware Distribution in Large-Scale Networks"; In NDSS, 2014; 16 pages. Feb. 23-26, 2014.

Chanhyun Kang, Noseong Park, B Aditya Prakash, Edoardo Serra, and VS Subrahmanian; "Ensemble Models for Data-Driven Prediction of Malware Infections"; In WSDM, 2016; 10 pages. Feb. 22-25, 2016.

Kazuaki Kishida; "Property of Average Precision and its Generalization: An Examination of Evaluation Indicator for Information Retrieval Experiments"; 2005; 20 pages. Oct. 2005.

Platon Kotzias, Leyla Bilge, and Juan Caballero; "Measuring PUP Prevalence and PUP Distribution Through Pay-Per-Install Services"; In USENIX Security, 2016; 19 pages. Aug. 10-12, 2016.

Srijan Kumar, Xikun Zhang, and Jure Leskovec; "Predicting Dynamic Embedding Trajectory in Temporal Interaction Networks"; In KDD, 2019; 10 pages. Aug. 4-8, 2019.

Bum Jun Kwon, Jayanta Mondal, Jiyong Jang, Leyla Bilge, and Tudor Dumitras; "The Dropper Effect: Insights into Malware Distribution with Downloader Graph Analytics"; In ACM CCS, 2015; 12 pages. Oct. 12-16, 2015.

Quoc Le and Tomas Mikolov; "Distributed Representations of Sentences and Documents"; In ICML, 2014; 9 pages.

Charles Lever, Manos Antonakakis, Bradley Reaves, Patrick Traynor, and Wenke Lee; "The Core of the Matter: Analyzing Malicious Traffic in Cellular Carriers"; In NDSS, 2013; 16 pages. Apr. 23, 2013.

Guanjun Lin, Jun Zhang, Wei Luo, Lei Pan, and YangXiang; "Poster: Vulnerability discovery with function representation learning from unlabeled projects"; In ACM CCS; 2017; 3 pages. Oct. 30-Nov. 3, 2017.

Yang Liu, Armin Sarabi, Jing Zhang, Parinaz Naghizadeh, Manish Karir, Michael Bailey, and Mingyan Liu; "Cloudy with a Chance of Breach: Forecasting Cyber Security Incidents"; In USENIX Security, 2015; 17 pages. Aug. 12-14, 2015.

Guanjun Lin, Jun Zhang, Wei Luo, Lei Pan, Yang Xiang, Olivier De Vel, and Paul Montague; "Cross-project transfer representation learning for vulnerable function discovery"; IEEE Transactions on Industrial Informatics; 2018; 9 pages. Apr. 2, 2018.

Christopher D Manning, Prabhakar Raghavan, and Hinrich Schütze; "Introduction to Information Retrieval"; Cambridge University Press, 2008; 581 pages.

Enrico Mariconti, Lucky Onwuzurike, Panagiotis Andriotis, Emiliano De Cristofaro, Gordon Ross, and Gianluca Stringhini; "MaMaDroid: Detecting Android Malware by Building Markov Chains of Behavioral Models"; In NDSS, 2017; 16 pages. Nov. 2017.

(56) References Cited

OTHER PUBLICATIONS

Omid Mirzaei, Guillermo Suarez-Tangil, Jose M de Fuentes, Juan Tapiador, and Gianluca Stringhini; "Andrensemble: Leveraging API Ensembles to Characterize Android Malware Families"; In ASIACCS, 2019; 8 pages. Jul. 2019.

Carey Nachenberg, Jeffrey Wilhelm, Adam Wright, and Christos Faloutsos; "Polonium: Tera-Scale Graph Mining and Inference for Malware Detection"; 2011; 8 pages. Jul. 25, 2010.

Alexey Natekin and Alois Knoll; "Gradient Boosting Machines, a Tutorial"; Frontiers in Neurorobotics; 7, 2013; 21 pages. Dec. 4, 2013.

Mark EJ Newman; "Clustering and Preferential Attachment in Growing Networks"; Physical review E, 64(2), 2001; 13 pages. Apr. 11, 2001.

James R Norris; "Markov Chains"; Cambridge University Press; 1998; 256 pages. Best Available Date: 1997.

Jon Oberheide and Charlie Miller; "Dissecting the Android Bouncer"; SummerCon2012; New York; 12, 2012; 62 pages.

Lawrence Page, Sergey Brin, Rajeev Motwani, and Terry Winograd; "The Pagerank Citation Ranking Bringing Order to the Web"; Technical report; 1999; 17 pages. Jan. 29, 1998.

Feargus Pendlebury, Fabio Pierazzi, Roberto Jordaney, Johannes Kinder, and Lorenzo Cavallaro; "Tesseract: Eliminating Experimental Bias in Malware Classification Across Space and Time"; In USENIX Security; 2019; 18 pages. V2—May 25, 2019; V3—Jun. 5, 2019; V4—Sep. 12, 2019.

Hao Peng, Chris Gates, Bhaskar Sarma, Ninghui Li, Yuan Qi, Rahul Potharaju, Cristina Nita-Rotaru, and Ian Molloy; "Using Probabilistic Generative Models for Ranking Risks of Android Apps"; In ACM CCS; 2012; 12 pages. Oct. 16-18, 2012.

Pascal Pons and Matthieu Latapy; "Computing Communities in Large Networks Using Random Walks"; In ICCIS; 2005; 28 pages. V1. Nov. 2005; V2. Apr. 2006.

Niels Provos, Dean McNamee, Panayiotis Mavrommatis, Ke Wang, Nagendra Modadugu, et al.; "The Ghost in the Browser: Analysis of Web-Based Malware"; HotBots; 2007; 9 pages. Apr 2007.

Foster Provost and R Kohavi; "Glossary of Terms"; Journal of Machine Learning; 30(2-3); 1998; 4 pages.

Babak Rahbarinia, Marco Balduzzi, and Roberto Perdisci; "Real-Time Detection of Malware Downloads via Large-Scale URL → File → Machine Graph Mining"; In ASIACCS; 2016; 12 pages. May 30-Jun. 3, 2016.

Moheeb Abu Rajab, Lucas Ballard, Noé Lutz, Panayiotis Mavrommatis, and Niels Provos; "Camp: Content-agnostic Malware Protection"; In NDSS; 2013; 15 pages. Apr. 23, 2013.

Benjamin Recht, Christopher Re, Stephen Wright, and Feng Niu; "Hogwild: A Lock-Free Approach to Parallelizing Stochastic Gradient Descent"; In NIPS; 2011; 9 pages.

Matilda Rhode, Pete Burnap, and Kevin Jones; "Earlystage Malware Prediction Using Recurrent Neural Networks"; Computers & Security; 2018; 13 pages. Best Available Date: Jul. 21, 2007.

Martin Rosvall and Carl T Bergstrom; "Maps of Random Walks on Complex Networks Reveal Community Structure"; Proceedings of the National Academy of Sciences; 105(4); 2008; 62 pages.

Carl Sabottke, Octavian Suciu, and Tudor Dumitras; "Vulnerability Disclosure in the Age of Social Media: Exploiting Twitter for Predicting Real-World Exploits"; In USENIX Security; 2015; 17 pages. Aug. 12-14, 2015.

Mahmood Sharif, Jumpei Urakawa, Nicolas Christin, Ayumu Kubota, and Akira Yamada; "Predicting Impending Exposure to Malicious Content from User Behavior"; In ACM CCS; 2018; 15 pages. Best Available Date: Oct. 15-19, 2018.

Yun Shen, Enrico Mariconti, Pierre Antoine Vervier, and Gianluca Stringhini; "Tiresias: Predicting Security Events Through Deep Learning"; In ACM CCS; 2018; 14 pages.

Yun Shen and Gianluca Stringhini; "ATTAK2VEC: Leveraging Temporal Word Embeddings to Understand the Evolution of Cyberattacks"; In USENIX Security; 2019; 17 pages. Best Available Date: Aug. 14, 2019.

Gianluca Stringhini, Pierre Mourlanne, Gregoire Jacob, Manuel Egele, Christopher Kruegel, and Giovanni Vigna; "EVILCOHORT: Detecting Communities of Malicious Accounts on Online Services"; In USENIX Security; 2015; 17 pages. Aug. 12-14, 2015.

Gianluca Stringhini, Yun Shen, Yufei Han, and Xiangliang Zhang; "Marmite: Spreading Malicious File Reputation Through Download Graphs"; In ACSAC; 2017; 12 pages.

Guillermo Suarez-Tangil and Gianluca Stringhini; "Eight Years of Rider Measurement in the Android Malware Ecosystem: Evolution and Lessons Learned"; arXiv preprint arXiv:1801.08115; 2018; 15 pages. V1—Jan. 24, 2018; V2—Mar. 30, 2020; V3—Jan. 17, 2022.

Nan Sun, Jun Zhang, Paul Rimba, Shang Gao, Leo Yu Zhang, and Yang Xiang; "Data-driven cybersecurity incident prediction: A survey"; IEEE Communications Surveys & Tutorials, 21(2); 2018; 29 pages.

Acar Tamersoy, Kevin Roundy, and Duen Horng Chau; Guilt by Association: Large Scale Malware Detection by Mining File-Relation Graphs; In KDD; 2014; 10 pages. Aug. 24-27, 2014.

Jian Tang, Jingzhou Liu, Ming Zhang, and Qiaozhu Mei; "Visualizing Large-Scale and High-Dimensional Data"; In WWW; 2016; 11 pages. Apr. 11-15, 2016.

Jian Tang, Meng Qu, Mingzhe Wang, Ming Zhang, Jun Yan, and Qiaozhu Mei; "Line: Large-scale information network embedding"; In WWW; 2015; 11 pages. May 18-22, 2015.

Kurt Thomas, Juan A Elices Crespo, Ryan Rasti, Jean-Michel Picod, Cait Phillips, Marc-André Decoste, Chris Sharp, Fabio Tirelo, Ali Tofigh, Marc-Antoine Courteau, et al.; "Investigating Commercial Pay-Per-Install and the Distribution of Unwanted Software"; In USENIX Security; 2016; 19 pages. Aug. 10-12, 2016.

Christopher Thompson, Martin Shelton, Emily Stark, Maximilian Walker, Emily Schechter, and Adrienne Porter Felt; "The Web's Identity Crisis: Understanding the Effectiveness of Website Identity Indicators"; In USENIX Security; 2019; 19 pages. Best Available Date: Aug. 14-16, 2019.

Haoyu Wang, Zhe Liu, Jingyue Liang, Narseo Vallina-Rodriguez, Yao Guo, Li Li, Juan Tapiador, Jingcun Cao, and Guoai Xu; "Beyond Google Play: A Large-Scale Comparative Study of Chinese Android App Markets"; In IMC; 2018; 15 pages. Best Available Date: Sep. 26, 2018.

Dominik Wermke, Nicolas Huaman, Yasemin Acar, Bradley Reaves, Patrick Traynor, and Sascha Fahl; "A Large-Scale Investigation of Obfuscation Use in Google Play"; In ACSAC; 2018; 14 pages. Best Available Date: Feb. 23, 2018.

Chao Yang, Zhaoyan Xu, Guofei Gu, Vinod Yegneswaran, and Phillip Porras; Droidminer: Automated Mining and Characterization of Fine-Grained Malicious Behaviors in Android Applications; In ESORICS; 2014; 18 pages. Sep. 2014.

Jheng-Hong Yang, Chih-Ming Chen, Chuan-Ju Wang, and Ming-Feng Tsai; Hop-Rec: High-Order Proximity for Implicit Recommendation; In RecSys; 2018; 5 pages. Best Available Date: Oct. 2-7, 2018.

Zhenlong Yuan, Yongqiang Lu, Zhaoguo Wang, and Yibo Xue; Droid-Sec: Deep Learning in Android Malware Detection; In ACM SIGCOMM Computer Communication Review; 2014; 2 pages. Best Available Date: Aug. 17-22, 2014.

Jian Zhang, Phillip A Porras, and Johannes Ullrich; "Highly predictive blacklisting"; In USENIX Security; 2008; 8 pages. Best Available Date: Dec 2008.

Tao Zhou, Jie Ren, Matúš Medo, and Yi-Cheng Zhang; "Bipartite Network Projection and Personal Recommendation"; Physical review E, 76(4); 2007; 7 pages.

Yajin Zhou and Xuxian Jiang; "Dissecting Android Malware: Characterization and Evolution"; In IEEE S&P; 2012; 15 pages. Best Available Date: May 20-23, 2012.

\* cited by examiner

|    | m1  | m2  | m3  | m4  | m5  |
|----|-----|-----|-----|-----|-----|
| d1 | 1st |     |     |     | 1st |
| d2 |     | 1st | 1st | 1st |     |
| d3 |     |     | 1st |     | 1st |
| d4 |     |     | 1st |     | 1st |
| d5 |     |     |     | 1st |     |

*FIG. 6A*

|    | m1  | m2  | m3  | m4  | m5  |
|----|-----|-----|-----|-----|-----|
| d1 | 1st | 3rd | 2nd | 3rd | 1st |
| d2 | 2nd | 1st | 1st | 1st | 2nd |
| d3 | 2nd | 3rd | 2nd | 3rd | 1st |
| d4 | 2nd | 2nd | 1st | 2nd | 1st |
| d5 |     | 2nd | 2nd | 1st | 3rd |

*FIG. 6B*

PROTECTING AGAINST POTENTIALLY HARMFUL APP INSTALLATION ON A MOBILE DEVICE

BACKGROUND

Potentially harmful apps (PHAs) are apps that could put users, user data, or mobile devices at risk. For example, some PHAs may include the functionality of a malware app, a trojan app, a phishing app, or a spyware app. PHAs are frequently manually installed by users on their mobile devices because PHAs often come disguised as useful apps with hidden malicious functionality, and are often suggested on mobile app stores based on the apps that users previously installed on their mobile devices.

Although mobile devices are frequently protected by a security app, the security app may run on the mobile device as a sandboxed app without root privileges. Therefore, even if the security app is able to detect that a user is manually downloading a PHA, it cannot block the download in real time or even automatically remove the PHA once it is installed. Further, the security app may not be able to automatically remove a PHA that is later discovered on the mobile device (e.g., due to a periodic scan for PHAs), but instead generally alerts the user of the PHA to give the user a choice to manually delete the PHA. Therefore, even where a security app is able to detect a PHA after installation on a mobile device, the PHA is often able to cause substantial harm to a user, user data, and/or the mobile device prior to detection by the security app.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for protecting against PHA installation on a mobile device may be performed, at least in part, by a computing device including one or more processors. The method may include identifying apps already installed on multiple mobile devices. The method may also include identifying PHAs in the apps already installed on the multiple mobile devices. The method may also include training a machine learning classifier, based on the apps already installed on multiple mobile devices, to predict a likelihood that each of the PHAs will be installed on any mobile device. The method may also include identifying one or more apps already installed on a particular mobile device. The method may also include predicting, using the machine learning classifier, a likelihood that a target PHA of the PHAs will be installed on the particular mobile device based on the one or more apps already installed on the particular mobile device. The method may also include, in response to the likelihood being higher than a threshold, performing a remedial action to protect the particular mobile device from the target PHA.

In some embodiments, the performing of the remedial action to protect the particular mobile device from the target PHA may include sending a security alert to a user associated with the particular mobile device regarding the target PHA of the PHAs. In these embodiments, the security alert may recommend that the user not install the target PHA on the particular mobile device or the security alert may recommend that the user only download the target PHA from a trusted source.

In some embodiments, the identifying of the apps already installed on the multiple mobile devices may include logging, using a security app installed on each of the multiple mobile devices, each installation of any app on each of the multiple mobile devices.

In some embodiments, the training of the machine learning classifier may include generating a PHA installation graph of the apps already installed on multiple mobile devices. In these embodiments, the predicting, using the machine learning classifier, of the likelihood that the target PHA will be installed on the particular mobile device may include performing a random walk of the PHA installation graph.

In some embodiments, one or more non-transitory computer-readable media may include one or more computer-readable instructions that, when executed by one or more processors of a computing device, cause the computing device to perform a method for protecting against PHA installation on a mobile device.

In some embodiments, a server device may include one or more processors and one or more non-transitory computer-readable media. The one or more non-transitory computer-readable media may include one or more computer-readable instructions that, when executed by the one or more processors, cause the server device to perform a method for protecting against PHA installation on a mobile device.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which:

FIG. 6A illustrates a 1-order matrix of a random walk through a PHA installation graph;

FIG. 6B illustrates a 3-order matrix of a random walk through a PHA installation graph;

DETAILED DESCRIPTION

Figure 1:
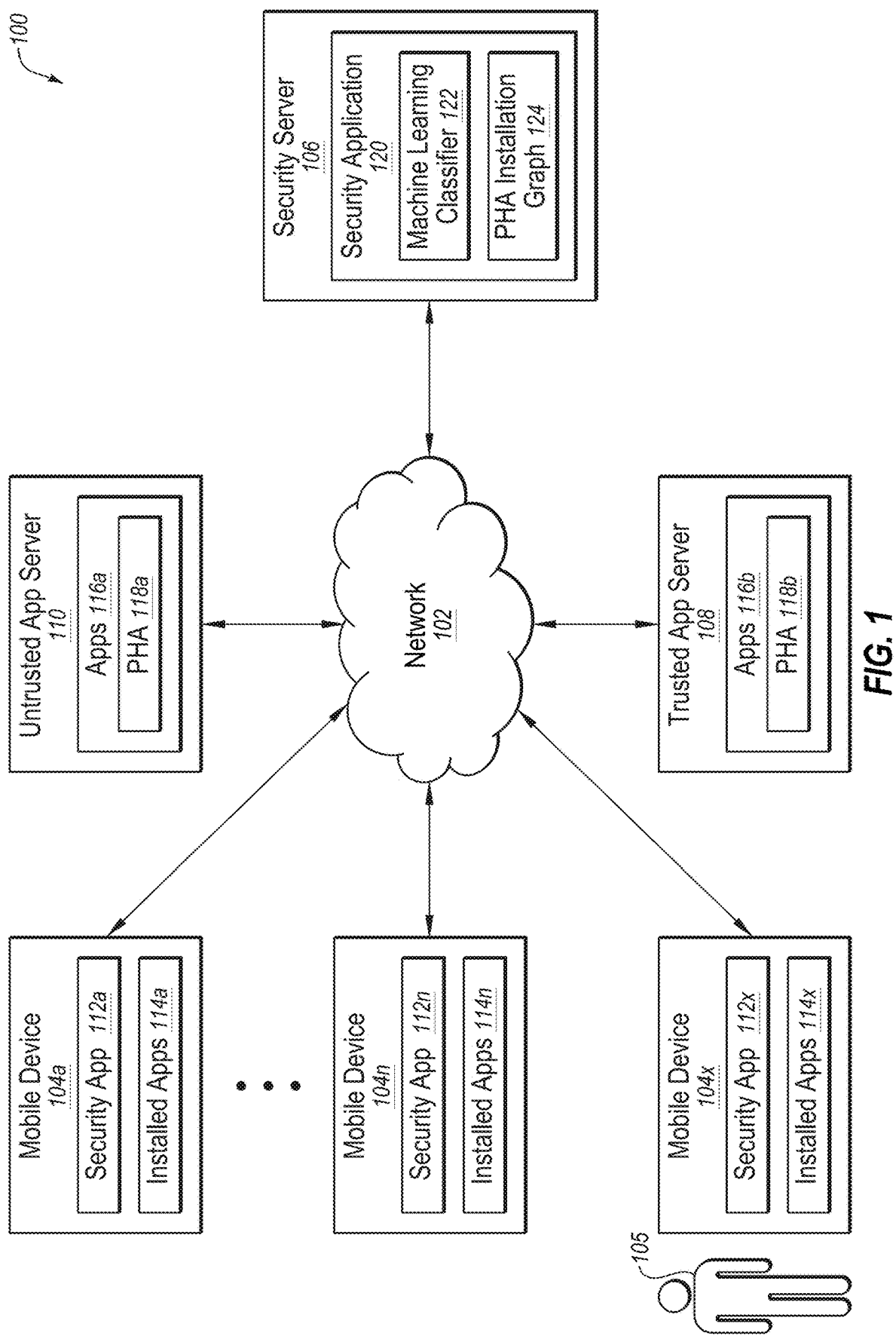
FIG. 1 illustrates an example system configured for protecting against PHA installation on a mobile device.

PHAs are frequently manually installed by users on their mobile devices due to PHAs coming disguised as useful apps with hidden malicious functionality. For example, PHAs are often suggested on mobile app stores based on the apps that users previously installed on their mobile devices. Although mobile devices are frequently protected by a security app, the security app may run on the mobile device as a sandboxed app without root privileges. Therefore, even if the security app is able to detect that a user is manually downloading a PHA, it cannot block the download in real time or even automatically remove the PHA once it is installed. Therefore, even where a security app is able to detect a PHA after installation on a mobile device, the PHA is often able to cause substantial harm to a user, user data, or the mobile device prior to detection by the security app.

Further, as Android has become a popular mobile operating system, Android has attracted significant interest by malicious parties who have developed apps with malicious purposes that target the Android platform. Millions of these malicious Android apps are observed every year, carrying out various types of harmful activity including, but not limited to, stealing private information from the mobile devices of victims, sending premium SMS messages, performing click fraud, and encrypting the victim's data in exchange for a ransom. Similar to what happens for desktop computers, not all malicious Android apps come with clearly harmful content, but some present unwanted components that are often an annoyance to the user (e.g., adware) or without user consent (e.g., click fraud). Google often refers to these potentially unwanted Android apps as PHAs. Unlike traditional desktop malware, which is often installed by automatically exploiting vulnerabilities in the victim's web browser and carrying out drive-by download attacks, Android PHAs tend to be manually installed by victims, who willingly choose to install apps that promise useful functionalities but come together with harmful code or advertising SDKs that hide malicious functionalities. In fact, a large majority of PHAs are manually installed via either the Google Play Store or other well-known side-loading apps such com.sec.android.easyMover and com.huawei.appmarket. To mitigate the threat of PHAs on Android, the security community has followed two directions. The first one is to analyze Android apps to identify malicious behavior. In the real world, this analysis usually takes place when apps are submitted to an Android marketplace. For example, Google uses a vetting system known as Android Bouncer. While quite effective in detecting malicious Android apps, these systems suffer from the limitation that the Android ecosystem is quite fragmented, and users install apps from a variety of sources, including alternative marketplaces that do not employ strict enough security measures. To complement market-level detection, many conventional security apps are available to users of mobile devices. Unfortunately, the Android security model severely limits their capabilities. Unlike traditional desktop anti-malware software, mobile solutions run as sandboxed apps without root privileges and cannot proactively block malicious downloads or even automatically remove a PHA once they find it; instead, they periodically scan the mobile device for suspicious apps and simply warn the user about newly discovered threats, prompting them to manually remove the detected PHAs. This is far from ideal because detection happens after the PHAs have been installed, leaving a window of vulnerability during which attackers can cause harm to the victims and their devices.

Some embodiments disclosed herein may protect against PHA installation on a mobile device. In some embodiments, a security application may identify apps already installed on multiple mobile devices and identify PHAs in the apps already installed on the multiple mobile devices. The security application may also train a machine learning classifier, based on the apps already installed on multiple mobile devices, to predict a likelihood that each of the PHAs will be installed on any mobile device. The security application may then identify one or more apps already installed on a particular mobile device, and predict, using the machine learning classifier, a likelihood that a target PHA of the PHAs will be installed on the particular mobile device based on the one or more apps already installed on the particular mobile device. Then, in response to the likelihood being higher than a threshold, the security application may perform a remedial action to protect the particular mobile device from the target PHA, such as sending a security alert to a user associated with the particular mobile device recommending that the user not install the target PHA on the particular mobile device or recommending that the user only download the target PHA from a trusted source.

In some embodiments, since the installation of a PHA on Android is usually a consequence of a user's own rational choices, the installation of a certain PHA on a user's device may be predicted by observing the apps that the user has installed in the past, together with which PHAs "similar" users have installed. For example, users with similar interests (e.g., gaming) might be active on the same third party marketplaces and receive suggestions to install similar PHAs (e.g., disguised as free versions of popular games). Where the security application is able to predict which PHA a user will attempt to install in the near future, the security application can display a warning to the user ahead of time and potentially convince them not to install that PHA, thereby closing the window of vulnerability between installation and detection introduced by traditional Android anti-malware software. To achieve an effective prediction of which PHAs will be installed on mobile devices in the future, the security application may employ an approach based on graph representation learning. This approach may allow the security application to automatically discover important features in raw data, without the need for feature engineering. The security application may first build a graph of PHA installation events on a global scale, in which edges represent which devices installed which PHAs. The security application may then apply representation learning to learn the low dimensional vertex representation of the PHA installation graph at a time t. Finally, the security application may predict new links that will be formed between mobile devices and PHAs that at a time t+d based on their respective properties and the currently observed links at the time t. The security application may then warn the user about PHAs that they will encounter and likely be interested in installing in the near future (e.g., on a third party Android marketplace), thus potentially complementing current on-device Android anti-malware solutions that can only act after the fact.

Thus, prior to a user manually installing a PHA on their mobile device, the security application may predict that the user will install the PHA on their mobile device in the near future based on apps already stored by the user on their mobile device, and may alert the user of this prediction to prevent the user from installing the PHA. Thus, the security application may predict installation of the PHA and alert the user to prevent the installation of the PHA, rather than only detecting the PHA after installation of the PHA. In this manner, the security application may prevent the substantial harm to a user, user data, or the mobile device that may occur were the target PHA to be installed on the mobile device.

Turning to the figures, FIG. 1 illustrates an example system 100 configured for protecting against PHA installation on a mobile device. The system 100 may include a network 102, mobile devices 104*a*-104*n*, a mobile device 104*x*, a security server 106, a trusted app server 108, and an untrusted app server 110.

In some embodiments, the network 102 may be configured to communicatively couple the devices and servers in the system 100 to one another, as well as to other network devices and other networks. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 8:
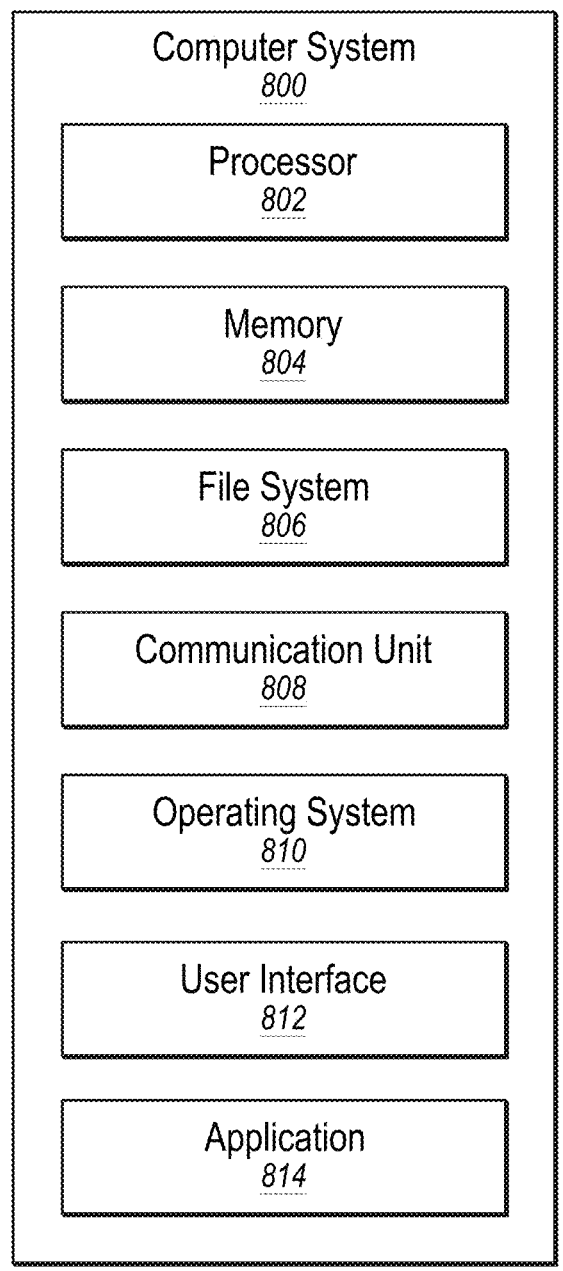
FIG. 8 illustrates an example computer system that may be employed in protecting against PHA installation on a mobile device.

In some embodiments, each of the mobile devices 104a-104n and 104x may be any computer system capable of communicating over the network 102 running installed apps 114a-114n and 114x, examples of which are disclosed herein in connection with the computer system 800 of FIG. 8. The mobile devices 104a-104n and 104x may further run security apps 112a-112n and 112x, which may function in connection with the security server 106 to track the installation of the installed apps 114a-114n and 114x and to protect the mobile devices 104a-104n and 104x from the installation of PHAs among the installed apps 114a-114n and 114x.

In some embodiments, the trusted app server 108 and the untrusted app server 110 may be any computer system capable of communicating over the network 102 and capable of storing apps 116a and 116b for download to mobile devices, examples of which are disclosed herein in connection with the computer system 800 of FIG. 8. The apps 116a and 116b stored on the trusted app server 108 and the untrusted app server 110 may include one or more PHAs, such as the PHA 118a and 118b. In some embodiments, a trusted app server may be the Google Play Store, while an untrusted app server may be an app server that is known to store apps with malicious functionality.

In some embodiments, the security server 106 may be any computer system capable of communicating over the network 102 and capable of executing a security application 120, examples of which are disclosed herein in connection with the computer system 800 of FIG. 8. The security application 120 may be configured to implement one or more actions of the methods disclosed herein. For example, the security application 120 may be configured to track installations of the installed apps 114a-114n on the mobile devices 104a-104n, including the installation of any PHAs, and the build a PHA installation graph 124. Further, the security application 120 may be configured to train a machine learning classifier 122 based on the installed apps 114a-114n and/or the PHA installation graph 124, and then employ the machine learning classifier 122 to predict whether a target PHA, such as the PHA 118a, will be installed on the mobile device 104x based on the installed apps 114x on the mobile device 104x. This prediction may allow the security application 120 to send a security alert to a user 105 associated with the mobile device 104x (e.g., the owner of the mobile device 104x or a system administrator in charge of security for the mobile device 104x) recommending that the user 105 not install the target PHA (e.g., the PHA 118a) on the mobile device 104x, or recommending that the user 105 only download the target PHA from a trusted source (e.g., recommending that a trusted version of the target PHA, such as the PHA 118b, be downloaded from the trusted app server 108 instead of downloading an untrusted version of the target PHA, such as the PHA 118a, from the untrusted app server 110). Thus, the security application 120 may predict installation of a target PHA and alert the user 105 to prevent the installation of the target PHA, rather than only detecting the target PHA after installation of the target PHA. In this manner, the security application 120 may prevent the substantial harm to the user 105, the data of the user 105, or the mobile device 104x that may occur were the target PHA to be installed on the mobile device 104x.

In some embodiments, users with similar interests and app installation history are likely to be exposed to and to decide to install the same PHA. Accordingly security application 120 may employ a predictive approach that can warn the user 105 about which PHAs they will encounter and potentially be tempted to install on the mobile device 104x in the near future. The security application 120 may employ graph representation learning to allow the learning of latent relationships between the mobile devices 104a-104n and PHAs and leverage them for prediction.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

Figure 2:
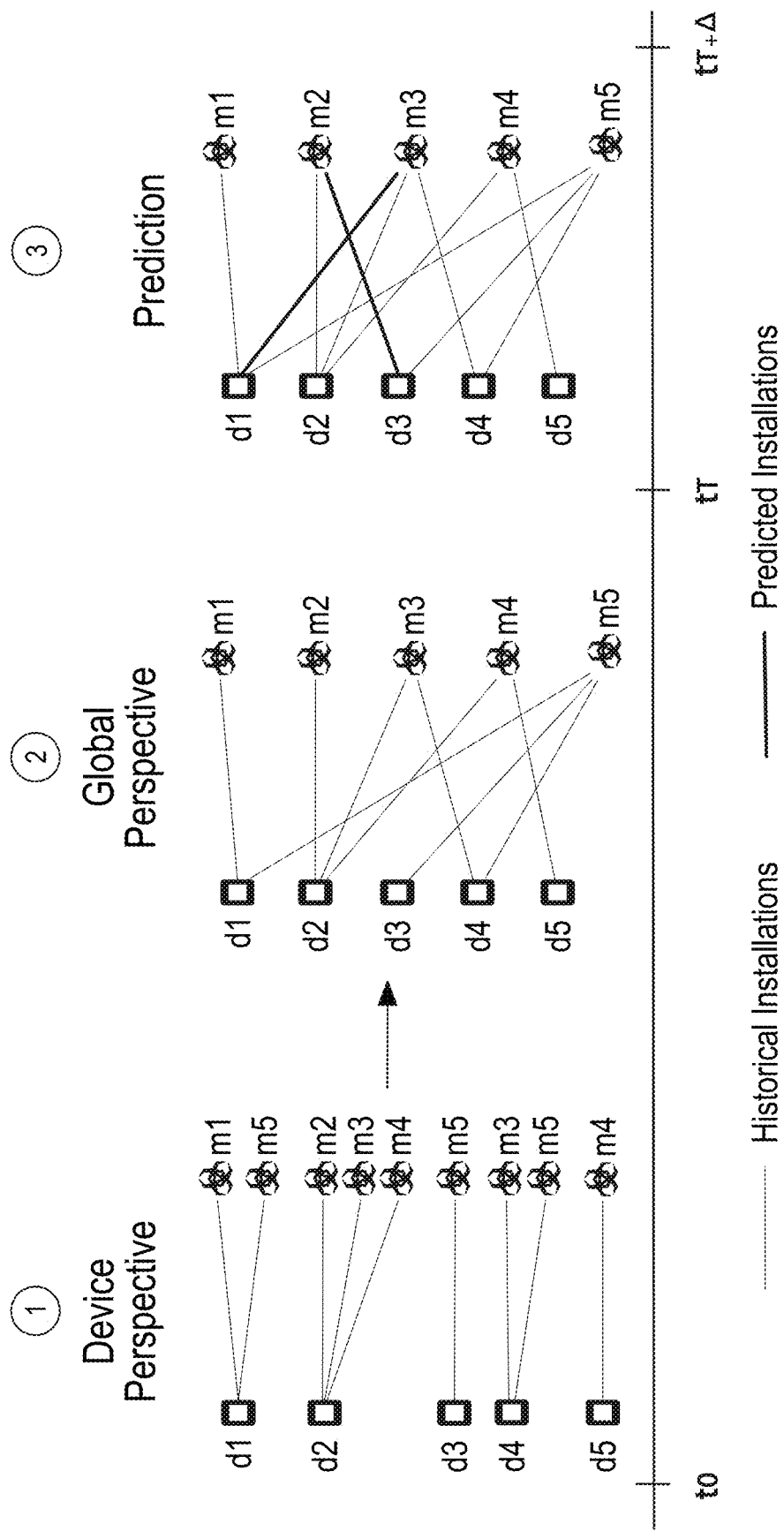
FIG. 2 illustrates various PHA installation graphs.

FIG. 2 illustrates various PHA installation graphs. Employing the security application 120 to look at mobile device activity in isolation may not provide enough information to predict the upcoming PHA installations for a given mobile device. Therefore, in some embodiments, the security application 120 may be employed to look at the installation behavior of multiple mobile devices, treating a mobile device's historical installation activities as its behavioral profile, and grouping mobile devices with similar profiles together. In this manner, the security application 120 may predict which PHA will be installed on a given mobile device by the mobile device's owner based upon the PHAs that have been installed by those with similar profiles. For example, as disclosed in FIG. 2, devices d1, d3, and d4 may share similar behavioral profiles. Given how Android marketplaces work, it is likely that PHAs m1 and m3 are PHAs that the owner of the device d3 is interested in, and they might have even been suggested by the marketplace itself. As such, it is more likely that the device d3 will install those PHAs in the future than a randomly chosen PHA. It is however not trivial to group devices with similar behavioral profiles. For example, the security application 120 may use a Jaccard similarity coefficient to calculate the similarity between two mobile devices, but this may lead to an O(n2) time complexity method to generate pair wise similarity for potentially millions of devices (or more), which may render such an approach practically infeasible.

To mitigate the aforementioned limitations, the security application 120 may approach the problem of predicting PHA installations in a principled way, by looking at the collective PHA installation events from a global perspective instead of focusing on a device level. As disclosed in FIG. 2, PHA installation graphs provide aggregated historical information of how the PHAs have been installed by mobile devices globally, and yield additional structural information by representing the relations between devices and PHAs as bipartite graphs. These PHA installation graphs may enable the security application 120 to capture the collective behavior from all devices, and may elicit the similarities between the download activity of different devices.

Leveraging this global installation graph for prediction, however, may present two challenges. The first challenge is the distribution of PHA installations among the devices. The security application 120 may use data on the PHAs installed by real devices over a set time period (e.g., a time period of one day) for illustration purposes. The distribution of PHA installations (i.e., vertex degrees from a graph perspective) may follow a power law distribution, which may indicate that there are popular PHAs with a number of installations that greatly exceed the average and that the majority of the PHA population only appears in a small number of devices. Preferential attachment may be an effective mechanism to explain conjectured power law degree distributions. The security application 120 may employ a model that considers both popular and less popular PHAs at the same time. The second challenge is modeling the implicit relationships among PHAs with limited information. For example, in the real world, a user may choose to install the PHA m1 due to a deceitful full-screen ad displayed in the PHA m5, and the PHA m3 could be willingly installed by a user on the device d4 because it was recommended by the same app store from which the PHA m5 was initially installed. Inferring these relationships from observing app installation may be challenging. The global installation graph illustrated in FIG. 2 may help identify these hidden relationships. By identifying possible correlations between PHA degrees and the average degrees of all vertices reachable by 2 hops (e.g., by a path (mi, dz, mj)) and 4 hops (e.g., by a path (mi, dz, mj, dl, mh)), two aspect may be observed. The first aspect is that there is a negative correlation in both cases. This indicates that PHAs with larger installations (e.g., more popular PHAs) are co-existing with smaller ones (e.g., less popular PHAs). The second aspect is that the correlation coefficient decreases with the increasing number of hops. For example, the correlation coefficient between PHA degrees and the average degrees of 2-hop vertices may be −0.28 while the correlation coefficient of those 4 hops away may be −0.11. To address these challenges, the security application 120 may employ random walk and graph representation learning. Graph representation learning may allow the security application 120 to take both popular and unpopular PHAs into account, while random walk may enable the security application 120 to harvest the aforementioned explicit and implicit relationships among PHAs for each device.

Figure 3:
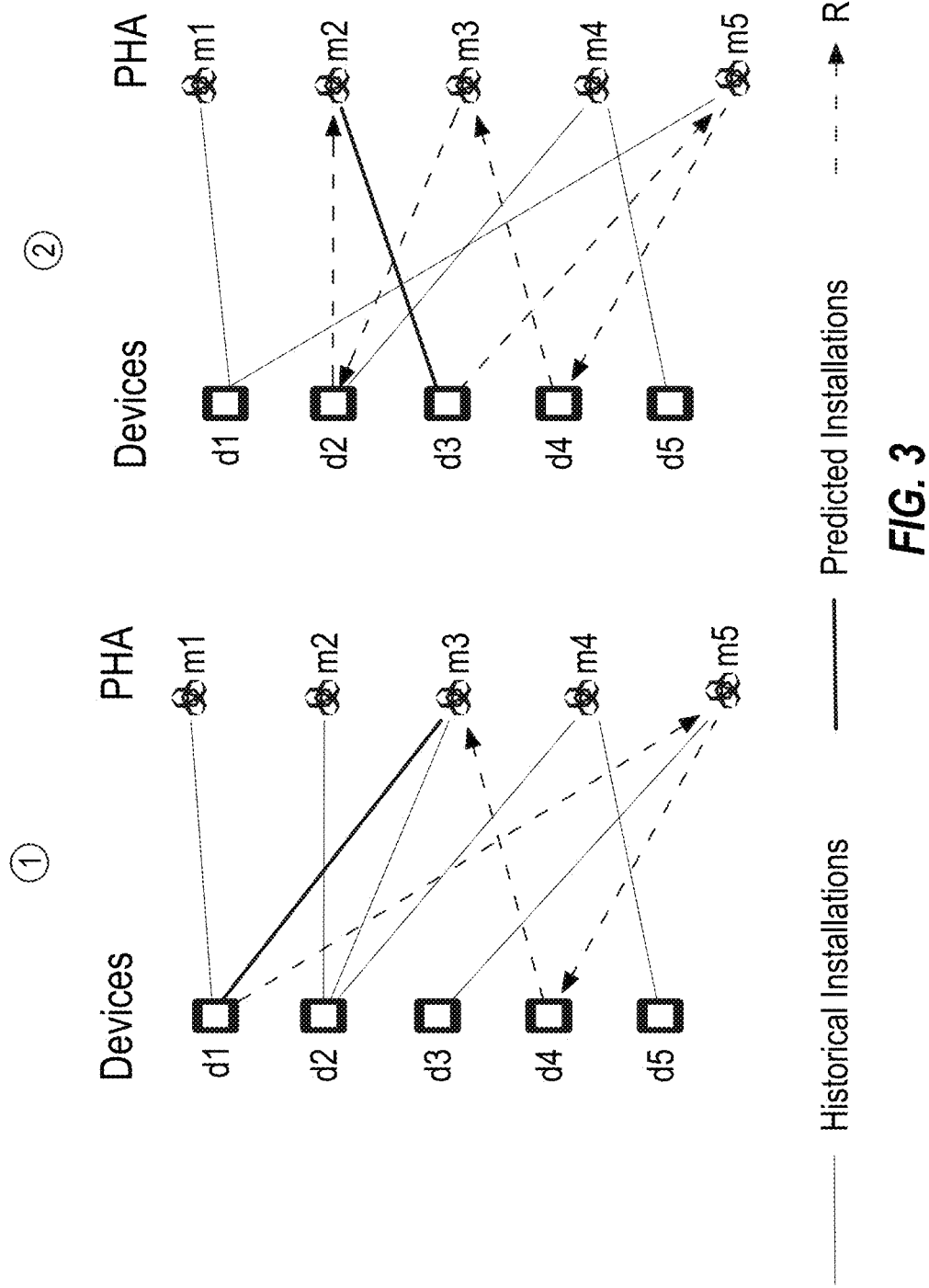
FIG. 3 illustrates random walks performed on PHA installation graphs.

FIG. 3 illustrates random walks performed on PHA installation graphs. As disclosed in the first PHA installation graph of FIG. 3, if the security application 120 attempts to predict the next PHA that the device dl will install, the security application 120 can take a random walk starting from the device dl to capture the aforementioned implicit relationship. Further, the random walk (d1, m5, d4, m3) illustrated in the first PHA installation graph of FIG. 3 offers the security application 120 an indication that the device d1 may potentially install the PHA m3 in the near future. Similarly, as illustrated in the second PHA installation graph of FIG. 3, a random walk (d3, m5, d4, m3, d2, m2) may capture the higher proximity relationship between the device d3 and the PHA m2 and may in turn facilitate the prediction. In some embodiments, leveraging graph representation learning to extract useful information from the random walks may enable the security application 120 to understand the explicit and implicit dynamics between devices and PHAs without a time-consuming feature engineering step, and may allow the security application 120 to accurately predict PHA installations in advance of (e.g., up to one week ahead of) the real installations.

In some embodiments, PHA installation prediction may be formulated as follows. D and M may denote all unique devices and PHAs respectively, and E may denote all observed PHA installation events. A global PHA installation graph may be a bipartite graph $G_{[t_0,t_T]}=(V, E)$, where $V=D\cup M$ denotes vertices in the graph, with each edge $e=(d_i,m_j,t_k)\in E$ representing a device $d_i\in D$ that installs a PHA $m_j\in M$ at a particular timestamp $t_k \leq t_T$. Some embodiments may learn lower d-dimensional representations of V in $g_{[t_0,t_T]}$ denoted as $\Phi_v \in \mathbb{R}^{|V|\times d}$, by taking global PHA installation information into consideration. With the learned vertex embeddings $\Phi_v$, some embodiments may train a prediction function $f$: $G_{(t_0,t_T]} \to E_{(t_T,t_{T+\Delta}]}$ that outputs a list of edges (i.e., PHA installations) that are not present in $G_{[t_0,t_T]}$, but that are predicted to appear in the graph $G_{(t_T,t_{T+\Delta}]}$ (as disclosed in the prediction PHA installation graph of FIG. 2). Some embodiments may predict the exact PHAs that are likely to be installed by the end users in the near future given their historical installation activities and the collective PHA installation events on a global scale.

Figure 4:
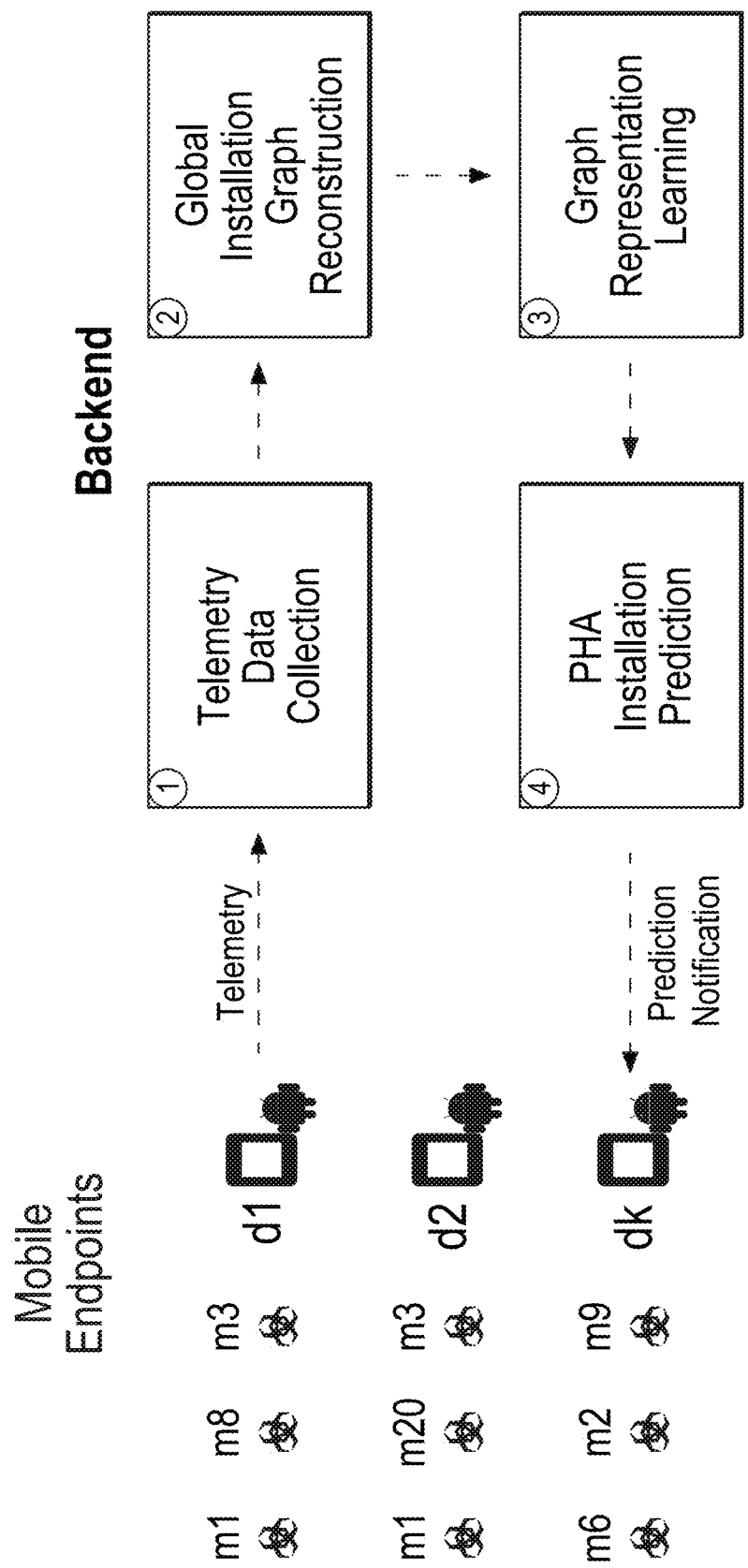
FIG. 4 illustrates a system for PHA installation predictions.

FIG. 4 illustrates a system for PHA installation predictions. The system of FIG. 4 may include a frontend component that is installed on mobile devices (e.g., the security apps 112a-112n and 112x), potentially alongside an existing mobile malware detection product. Every time the malware detection product detects that a PHA has been installed, the mobile device may send data to backend infrastructure (e.g., to the security application 120). The backend component of the system of FIG. 4 may use this data to build a global PHA installation graph (e.g., the PHA installation graph 124). The backend component may then leverage graph representation learning to capture the collective behavior from all devices and understand the implicit relationships among the PHAs in a latent space. The backend component may periodically train a prediction engine (e.g., the machine learning classifier 122) based upon these historical installations, and may predict the impending PHA installations on the mobile devices that installed the frontend component in the future. When the backend component predicts that a mobile device's user will attempt to install a certain PHA in the near future (for example because this PHA will appear as a suggestion on a third party market), it may send an alert to the mobile device so that the device's owner is warned about the threat and may reach an informed decision to not install a PHA which might weaken their device security.

Figure 5:
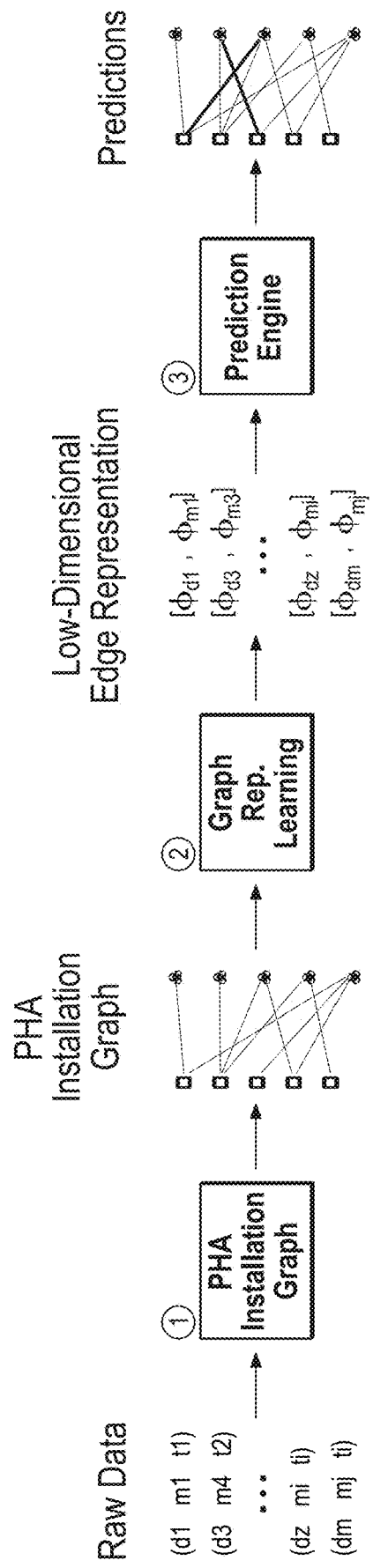
FIG. 5 illustrates an architecture for PHA installation predictions.

FIG. 5 illustrates an architecture for PHA installation predictions. In particular, FIG. 5 illustrates a workflow at the backend infrastructure (e.g., at the security application 120). Its operation may include at least three steps: (1) reconstruction of the global PHA installation graph, (2) graph representation learning, and (3) PHA installation prediction.

With regard to step (1), the goal of this step may be building an installation graph that encapsulates a comprehensive view of how PHAs are installed by mobile devices on a global scale. To build the graph, the security application 120 may take as input the streams of detected PHA installation events generated by the mobile devices. These events may be treated as tuples, in the format of $(d_i, m_j, t_k)$. A may denote the symmetric adjacency matrix of $G$. $A_{d_i,m_j}=1$ if $d_i$ and $m_j$ are linked in the same installation event, otherwise $A_{d_i,m_j}=0$. The output of this step may be a global PHA installation graph G represented by the adjacency matrix $A^{|D|\times|M|}$. This matrix may be used by the graph representation learning module in the next step.

With regard to step (2), the security application 120 may learn the low dimensional vertex representations (i.e., vertex embeddings) of the PHA installation graph. The security application 120 may take a number of truncated random walks from each vertex $d_i \in D$ in the graph G. These random walks may effectively capture the high-order indirect connections between mobile devices and PHAs. In this way, the security application 120 may explicitly build a high-order proximity transition matrix between D and M. It may then factorize this matrix together with a decay factor to account for the strength of the implicit connections. The output of this step may be the low dimensional vertex representations (e.g., $\varphi_v$) that may be used to model PHA installation events in the latent space.

With regard to step (3), taking the vertex embeddings as the input, the security application 120 may models the observed PHA installation events in the latent space and train a prediction model (e.g., the machine learning classifier 122) to predict future installations. First, the security application 120 may model the observed PHA installations by concatenating two low dimensional vertex embeddings in the latent space (e.g., $\varphi_e = \text{concat}(\Phi_{d_i}, \Phi_{m_j})$, where $e \in E$). Effectively, each PHA installation event may be represented by a 2d-dimensional vector. The security application 120 may then formulate the prediction task as a binary prediction problem for edges (i.e., PHA installations) in the graph where two classes are considered: positive or presence of edges and negative or absence of edges. The security application 120 may sample an equal number of non-existing edges from the observed PHA installation edges (e.g., positive class) to form the negative class and train the prediction model. The output of the PHA installation prediction may be a list of edges (e.g., PHA installations) that are not present in $[t_0, t_T]$, but that are predicted to appear in the $(t_T, t_T+\Delta]$. These predictions may then be leveraged to warn the user ahead of time about PHAs that they are likely to encounter and that they might be enticed to install.

Some embodiments may involve building a model that learns both explicit relations between devices and PHAs and implicit relationships among PHAs from the global PHA installation graph, and that predicts future installations, which may be accomplished using a graph representation learning model. Representation learning may be able to extract useful information to build prediction models without feature engineering. This characteristic of representation learning may be particularly desirable since it may enable the understanding of the explicit and implicit dynamics between devices and PHAs without a time-consuming feature engineering step. Random walk may provide insightful transitive associations between two vertices in a graph, and may be successfully applied in numerous settings, e.g., community detection, personalized PageRank, and Sybil account detection. Some embodiments may involve building a high-order proximity matrix by conducting truncated random walks with a decay factor on the global PHA installation graph. This proximity matrix may capture both direct and indirect relationships between devices and PHAs, and, at the same time, may discriminates the strength between different orders of proximity due to the decay factor. The low dimensional representations may be later learned by factorizing this high-order proximity matrix using random walk approximation techniques.

The following definition describes some technical details of the security application 120 in formal terms. With regard to l-order proximity, $RW_{d_0} = (d^0, m_i^1, d_j^1, m_z^2, \ldots, d_h^{l-1}, m_k^l, \ldots)$ may denote a random walk starting from a device vertex $d_0$ on a PHA installation graph $G = (D \cup M, E)$ where superscript denotes the rank of vertex occurrence in the random walk. l-order proximity between $d_0 \in D$ and $m_k^l \in M$ may be defined by a decay function C (see Eq. 1) of the rank of occurrence (i.e., C(l)) and the transition probability between them in the random walk. If there is no walkable path from d to $m_k^l$, the l-order proximity may be 0. For example, given a random walk $RW_{d_1^0} = (d_1^0, m_5^1, d_4^1, m_3^2)$ as illustrated in the first graph of FIG. 3, $m_3$ is at 2-order proximity of $d_1$.

Similarly, given a random walk $RW_{d_3^0} = (d_3^0, m_5^1, d_4^1, m_3^2, d_2^3, m_2^3)$ as illustrated in the second graph of FIG. 3, $m_2$ is a 3-order proximity of $d_3$.

FIG. 6A illustrates a 1-order matrix of a random walk through a PHA installation graph, and FIG. 6B illustrates a 3-order matrix of a random walk through a PHA installation graph. More particularly, FIGS. 6A and 6B who two l-order proximity matrices induced by random walks, with FIG. 6A showing an example of 1-order proximity matrix and FIG. 6B showing an example of a 3-order proximity matrix induced by random walks on the PHA installation graph (see FIG. 2). As disclosed in FIGS. 6A and 6B, with the increasing value of l, l-order proximity captures more high-order relationship information between devices and PHAs.

Given the l-order proximity matrix, formally the objective function for learning low dimensional representations (i.e., $\Phi$) may be defined in Equation 1:

$$\mathcal{L}_{ANDR\S} = \sum_{\substack{1 \leq l \leq K \\ d_i, (m_j, m'_j)}} C(l) \mathbb{E}_{\substack{m_j \sim P_{d_i}^l \\ m'_j \sim P_N}} \left[ \mathcal{F}\left(\Phi_{d_i}^T \Phi_{m'_j}, \Phi_{d_i}^T \Phi_{m_j}\right) \right] + \lambda \Phi \|\Phi\|_2^2 \quad (1)$$

where $C(l) = 1/l$ denotes the decay function, $P_{d_i}^l(\cdot)$ denotes the l-order probability distribution of the PHA $m_j$ sampled from a random walk $RW_{d_i}$ (see Eq. 2), $P_N$ denotes a uniform distribution of all items from which a PHA i' was drawn, and $F(\Phi^T_{d_i}\Phi_{m_j}, \Phi_{d_i}^T\Phi_{d_j})$ is a ranking objective function discriminating the observed PHAs installations (e.g., $\Phi^T_{d_i}\Phi_{m_j}$) from unobserved PHA installations (e.g., $\Phi^T_{d_i}\Phi_{m_j}$) in the low dimensional embedding space (see Eq. 3).

Equation 2 may be formalized as:

$$P_{v_x}^l(v_y) = \begin{cases} \dfrac{A_{v_x, v_y} \deg(v_y)}{\sum_{v'_y} A_{v_x, v'_y} \deg(v'_y)} & \text{if } l = 1 \text{ and } v_x \in D \\[1em] \dfrac{A_{v_y, v_x} \deg(v_y)}{\sum_{v_{y'}} A_{v'_y, v_x} \deg(v'_y)} & \text{if } l = 1 \text{ and } v_x \in M \\[1em] P_{v_x}^l(v_\alpha) P_{v_\alpha}^{l-1}(v_\beta) P_{v_\beta}^1(v_y) & \text{otherwise} \end{cases} \quad (2)$$

which approximates the probability of sampling a l-th neighbor $v_y$ for $v_x$ given a random walk $(v_x, v_\alpha, \ldots, v_\beta, v_y)$, where $v_\alpha$ denotes the vertex after visiting $v_x$ and $v_\beta$ denotes the vertex before $v_y$. In this way, it simplifies the cumulative process of counting all intermediate vertices from all possible random walks from $v_x$ to $v_y$ in a recursive manner. Note that if $v_x \in D$, then $v_\alpha \in M$. Otherwise if $v_x \in M$, then $v_\alpha \in D$. For example, given a random walk $RW_{d_1^0} = (d_1^0, m_5^1, d_4^1, m_3^2)$ as illustrated in the first graph of FIG. 3, $v_x$ is $d_1^0$, $v_\alpha$ is $m_5$, $v_\beta$ is $d_4$ and $v_y$ is $m_3^2$. The ranking objective function $F(\cdot)$ may be defined in Equation 3 as follows:

$$\mathcal{F}\left(\Phi_{d_i}^T \Phi_{m'_j}, \Phi_{d_i}^T \Phi_{m_j}\right) = \mathbb{1}_{\left(\delta > \frac{\varepsilon}{k}\right)} \log(\delta) \quad (3)$$

where $\delta = \Phi^T_{d_i}\Phi_{m_j} - \Phi^T_{d_i}\Phi_{m_j}$ and $\mathbb{1}_\varsigma : \varsigma \to \zeta\{0,1\}$ denotes an indicator function for condition $\varsigma$, where $$\varsigma = \delta > \frac{\varepsilon}{k}.$$

Some embodiments may employ a random walk approximation technique to approximate the matrix factorization results. Equation 1 may be accordingly minimized using asynchronous stochastic gradient descent.

Figure 7:
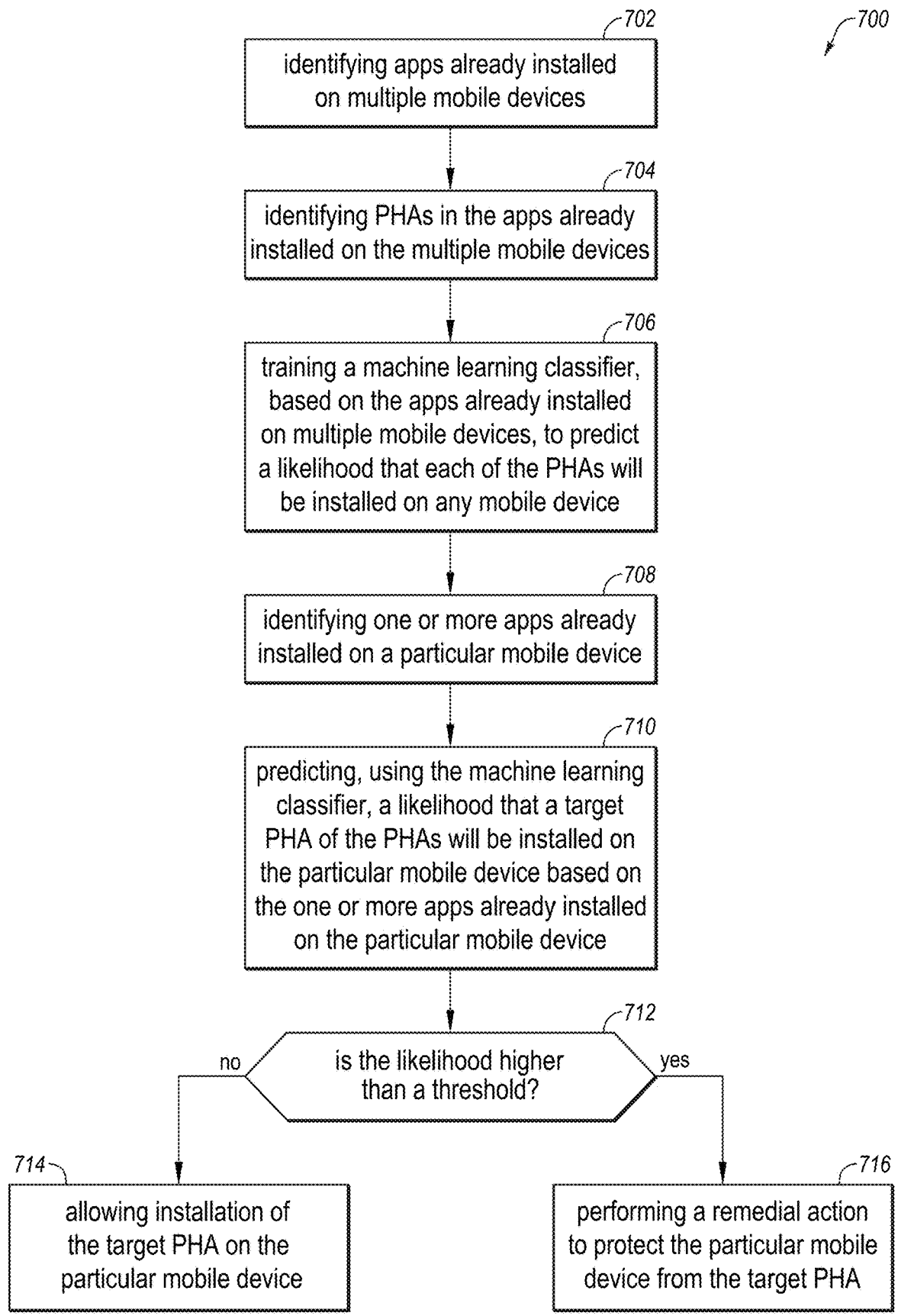
FIG. 7 is a flowchart of an example method for protecting against PHA installation on a mobile device.

FIG. 7 is a flowchart of an example method 700 for protecting against PHA installation on a mobile device. The method 700 may be performed, in some embodiments, by one or more applications, devices, or systems, such as by the security application 120 of FIG. 1, or some other app(s) or application(s), or some combination thereof. In these and other embodiments, the method 700 may be performed by one or more processors based on one or more computer-readable instructions stored on one or more non-transitory computer-readable media. The method 700 will now be described in connection with FIGS. 1-7.

The method 700 may include, at action 702, identifying apps already installed on multiple mobile devices. In some embodiments, the identifying of the apps already installed on the multiple mobile devices may include logging, using a security app installed on each of the multiple mobile devices, each installation of any app on each of the multiple mobile devices. For example, the security application 120 may identify, at action 702, the installed apps 114a-114n that are already installed on mobile devices 104a-104n by logging, using the security apps 112a-112n, each installation of any app on each of the mobile devices 104a-104n.

The method 700 may include, at action 704, identifying PHAs in the apps already installed on the multiple mobile devices. For example, the security application 120 may identify, at action 704, PHAs (such as the PHAs 118a and 118b) in the installed apps 114a-114n that are already installed on mobile devices 104a-104n.

The method 700 may include, at action 706, training a machine learning classifier, based on the apps already installed on multiple mobile devices, to predict a likelihood that each of the PHAs will be installed on any mobile device. In some embodiments, the training of the machine learning classifier may include generating a PHA installation graph of the apps already installed on multiple mobile devices. For example, the security application 120 may train, at action 706, the machine learning classifier 122, based on the installed apps 114a-114n that are already installed on mobile devices 104a-104n, to predict a likelihood that each of the PHAs (such as the PHAs 118a and 118b) will be installed on any mobile device. This training may include generating the PHA installation graph 124.

The method 700 may include, at action 708, identifying one or more apps already installed on a particular mobile device. For example, the security application 120 may identify, at action 708, the installed apps 114x that are already installed on mobile device 104x.

The method 700 may include, at action 710, predicting, using the machine learning classifier, a likelihood that a target PHA of the PHAs will be installed on the particular mobile device based on the one or more apps already installed on the particular mobile device. In some embodiments, the predicting, using the machine learning classifier, of the likelihood that the target PHA will be installed on the particular mobile device may include performing a random walk of the PHA installation graph. For example, the security application 120 may predict, at action 710, using the machine learning classifier 122, a likelihood (e.g., 25% (or 0.25), or 80% (or 0.80)), that a target PHA of the PHAs, such as the PHA 118a, will be installed on the mobile device 104x by the user 105 (e.g., in the next week or other time period) based on the installed apps 114x that are already installed on mobile device 104x. In this example, this predicting may include performing a random walk of the PHA installation graph 124.

The method 700 may include, at action 712, determining whether the likelihood is higher than a threshold. If not (not at action 712), the method 700 may include an action 714, but if so (yes at action 712), the method 700 may include an action 716. For example, the security application 120 may determine, at action 712, whether the likelihood (that was predicted at action 710) is higher than a threshold. For example, where the likelihood predicted at action 710 is 25% (or 0.25), but the threshold likelihood is 75% (or 0.75), then the security application 120 may proceed to the action 714 because the likelihood is not higher than the threshold (i.e., no at action 712). In another example, where the likelihood predicted at action 710 is 80% (or 0.80), and the threshold likelihood is 75% (or 0.75), then the security application 120 may proceed to the action 716 because the likelihood is higher than the threshold (i.e., yes at action 712).

The method 700 may include, at action 714, allowing installation of the target PHA on the particular mobile device. For example, the security application 120 may allow, at action 714, installation of the target PHA (e.g., the PHA 118a) on the mobile device 104x by the user 105.

The method 700 may include, at action 716, performing a remedial action to protect the particular mobile device from the target PHA. In some embodiments, the performing of the remedial action to protect the particular mobile device from the target PHA may include sending a security alert to a user associated with the particular mobile device regarding the target PHA of the PHAs. In these embodiments, the security alert may recommend that the user not install the target PHA on the particular mobile device or the security alert may recommend that the user only download the target PHA from a trusted source. For example, the security application 120 may perform, at action 716, a remedial action to protect the mobile device 104x from the target PHA (e.g., the PHA 118a). In this example, the performing of the redial action may include sending a security alert to the user 105 (e.g., via presentation on the security app 112x, via an email, via text message, etc.) regarding the target PHA (e.g., the PHA 118a), such as where the security alert recommends that the user 105 not install the PHA 118a on the mobile device 104x, or recommends that the user 105 only download the target PHA from a trusted source (e.g., download a trusted version of the target PHA from the trusted app server 108, namely the PHA 118b).

In some embodiments, the method 700 may be employed to train the machine learning classifier 122 based on the installed apps 114a-114n and/or the PHA installation graph 124, and then may employ the machine learning classifier 122 to predict whether a target PHA, such as the PHA 118a, will be installed on the mobile device 104x based on the installed apps 114x on the mobile device 104x. This prediction may allow the security application 120 to send a security alert to the user 105. Thus, the method 700 may predict installation of a target PHA and alert the user 105 to prevent the installation of the target PHA, rather than only detecting the target PHA after installation of the target PHA. In this manner, the method 700 may prevent the substantial harm to the user 105, the data of the user 105, or the mobile device 104x that may occur were the target PHA to be installed on the mobile device 104x.

Although the actions of the method 700 are illustrated in FIG. 7 as discrete actions, various actions may be divided into additional actions, combined into fewer actions, reordered, expanded, or eliminated, depending on the desired implementation. For example, in some embodiments, the actions 702-710 may be performed without performing the other actions of the method 700. Further, in some embodiments, the action 716 may be performed by a network administrator or other entity that is different from the entity or entities performing the other actions of the method 700.

FIG. 8 illustrates an example computer system 800 that may be employed in protecting against PHA installation on a mobile device. In some embodiments, the computer system 800 may be part of any of the systems or devices described in this disclosure. For example, the computer system 800 may be part of any of the mobile devices 104a-104n and 104x or the servers 106, 108, and 110 of FIG. 1.

The computer system 800 may include a processor 802, a memory 804, a file system 806, a communication unit 808, an operating system 810, a user interface 812, and an application 814, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 802 may include any suitable special-purpose or general-purpose computer, computing entity, or processing device including various computer hardware or software applications and may be configured to execute instructions stored on any applicable computer-readable storage media. For example, the processor 802 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 802 may interpret and/or execute program instructions and/or process data stored in the memory 804 and/or the file system 806. In some embodiments, the processor 802 may fetch program instructions from the file system 806 and load the program instructions into the memory 804. After the program instructions are loaded into the memory 804, the processor 802 may execute the program instructions. In some embodiments, the instructions may include the processor 802 performing one or more actions of the methods disclosed herein.

The memory 804 and the file system 806 may include computer-readable storage media for carrying or having stored thereon computer-executable instructions or data structures. Such computer-readable storage media may be any available non-transitory media that may be accessed by a general-purpose or special-purpose computer, such as the processor 802. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 802 to perform a certain operation or group of operations, such as one or more actions of the methods disclosed herein. These computer-executable instructions may be included, for example, in the operating system 810, in one or more applications, such as in any of the apps or application disclosed herein, or in some combination thereof.

The communication unit 808 may include any component, device, system, or combination thereof configured to transmit or receive information over a network, such as the network 102 of FIG. 1. In some embodiments, the communication unit 808 may communicate with other devices at other locations, the same location, or even other components within the same system. For example, the communication unit 808 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMAX device, a cellular communication device, etc.), and/or the like. The communication unit 808 may permit data to be exchanged with a network and/or any other devices or systems, such as those described in the present disclosure.

The operating system 810 may be configured to manage hardware and software resources of the computer system 800 and configured to provide common services for the computer system 800.

The user interface 812 may include any device configured to allow a user to interface with the computer system 800. For example, the user interface 812 may include a display, such as an LCD, LED, or other display, that is configured to present video, text, application user interfaces, and other data as directed by the processor 802. The user interface 812 may further include a mouse, a track pad, a keyboard, a touchscreen, volume controls, other buttons, a speaker, a microphone, a camera, any peripheral device, or other input or output device. The user interface 812 may receive input from a user and provide the input to the processor 802. Similarly, the user interface 812 may present output to a user.

The application 814 may be one or more computer-readable instructions stored on one or more non-transitory computer-readable media, such as the memory 804 or the file system 806, that, when executed by the processor 802, is configured to perform one or more actions of the methods disclosed herein. In some embodiments, the application 814 (e.g., app) may be part of the operating system 810 or may be part of an application of the computer system 800, or may be some combination thereof. In some embodiments, the application 814 may function as any of the apps or application disclosed herein.

Modifications, additions, or omissions may be made to the computer system 800 without departing from the scope of the present disclosure. For example, although each is illustrated as a single component in FIG. 8, any of the components 802-814 of the computer system 800 may include multiple similar components that function collectively and are communicatively coupled. Further, although illustrated as a single computer system, it is understood that the computer system 800 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 802 of FIG. 8) including various computer hardware or software applications, as discussed in greater detail below. Further, as indicated above, embodiments described herein may be implemented using computer-readable media (e.g., the memory 804 or file system 806 of FIG. 8) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for protecting against potentially harmful app (PHA) installation on a mobile device, at least a portion of the method being performed by a computing device comprising one or more processors, the computer-implemented method comprising:
   identifying apps already installed on multiple mobile devices;
   identifying PHAs in the apps already installed on the multiple mobile devices;
   training a machine learning classifier, based on the apps already installed on multiple mobile devices, to predict a likelihood that each of the PHAs will be installed on any mobile device, wherein the training of the machine learning classifier comprises generating a PHA installation graph of the apps already installed on the multiple mobile devices;
   identifying one or more apps already installed on a particular mobile device;
   predicting, using the machine learning classifier, a likelihood that a target PHA of the PHAs will be installed on the particular mobile device based on the one or more apps already installed on the particular mobile device; and
   in response to the likelihood being higher than a threshold, performing a remedial action to protect the particular mobile device from the target PHA.

2. The computer-implemented method of claim 1, wherein the performing of the remedial action to protect the particular mobile device from the target PHA comprises sending a security alert to a user associated with the particular mobile device regarding the target PHA of the PHAs.

3. The computer-implemented method of claim 2, wherein the security alert recommends that the user not install the target PHA on the particular mobile device.

4. The computer-implemented method of claim 2, wherein the security alert recommends that the user only download the target PHA from a trusted source.

5. The computer-implemented method of claim 1, wherein the identifying of the apps already installed on the multiple mobile devices comprises logging, using a security app installed on each of the multiple mobile devices, each installation of any app on each of the multiple mobile devices.

6. The computer-implemented method of claim 1, wherein the predicting, using the machine learning classifier, of the likelihood that the target PHA will be installed on the particular mobile device comprises performing a random walk of the PHA installation graph.

7. One or more non-transitory computer-readable media comprising one or more computer-readable instructions that, when executed by one or more processors of a computing device, cause the computing device to perform a method for protecting against potentially harmful app (PHA) installation on a mobile device, the method comprising:
  identifying apps already installed on multiple mobile devices;
  identifying PHAs in the apps already installed on the multiple mobile devices;
  training a machine learning classifier, based on the apps already installed on multiple mobile devices, to predict a likelihood that each of the PHAs will be installed on any mobile device, wherein the training of the machine learning classifier comprises generating a PHA installation graph of the apps already installed on the multiple mobile devices;
  identifying one or more apps already installed on a particular mobile device;
  predicting, using the machine learning classifier, a likelihood that a target PHA of the PHAs will be installed on the particular mobile device based on the one or more apps already installed on the particular mobile device; and
  in response to the likelihood being higher than a threshold, performing a remedial action to protect the particular mobile device from the target PHA.

8. The one or more non-transitory computer-readable media of claim 7, wherein the performing of the remedial action to protect the particular mobile device from the target PHA comprises sending a security alert to a user associated with the particular mobile device regarding the target PHA of the PHAs.

9. The one or more non-transitory computer-readable media of claim 8, wherein the security alert recommends that the user not install the target PHA on the particular mobile device.

10. The one or more non-transitory computer-readable media of claim 8, wherein the security alert recommends that the user only download the target PHA from a trusted source.

11. The one or more non-transitory computer-readable media of claim 8, wherein the identifying of the apps already installed on the multiple mobile devices comprises logging, using a security app installed on each of the multiple mobile devices, each installation of any app on each of the multiple mobile devices.

12. The one or more non-transitory computer-readable media of claim 7, wherein the predicting, using the machine learning classifier, of the likelihood that the target PHA will be installed on the particular mobile device comprises performing a random walk of the PHA installation graph.

13. A server device comprising:
  one or more processors; and
  one or more non-transitory computer-readable media comprising one or more computer-readable instructions that, when executed by the one or more processors, cause the server device to perform a method for protecting against potentially harmful app (PHA) installation on a mobile device, the method comprising:
    identifying apps already installed on multiple mobile devices;
    identifying PHAs in the apps already installed on the multiple mobile devices;
    training a machine learning classifier, based on the apps already installed on multiple mobile devices, to predict a likelihood that each of the PHAs will be installed on any mobile device, wherein the training of the machine learning classifier comprises generating a PHA installation graph of the apps already installed on the multiple mobile devices;
    identifying one or more apps already installed on a particular mobile device;
    predicting, using the machine learning classifier, a likelihood that a target PHA of the PHAs will be installed on the particular mobile device based on the one or more apps already installed on the particular mobile device; and
    in response to the likelihood being higher than a threshold, performing a remedial action to protect the particular mobile device from the target PHA.

14. The server device of claim 13, wherein the performing of the remedial action to protect the particular mobile device from the target PHA comprises sending a security alert to a user associated with the particular mobile device regarding the target PHA of the PHAs.

15. The server device of claim 14, wherein the security alert recommends that the user not install the target PHA on the particular mobile device.

16. The server device of claim 14, wherein the security alert recommends that the user only download the target PHA from a trusted source.

17. The server device of claim 13, wherein the identifying of the apps already installed on the multiple mobile devices comprises logging, using a security app installed on each of the multiple mobile devices, each installation of any app on each of the multiple mobile devices.

18. The server device of claim 13, wherein:
  the predicting, using the machine learning classifier, of the likelihood that the target PHA will be installed on the particular mobile device comprises performing a random walk of the PHA installation graph.

* * * * *